UNITED STATES PATENT OFFICE.

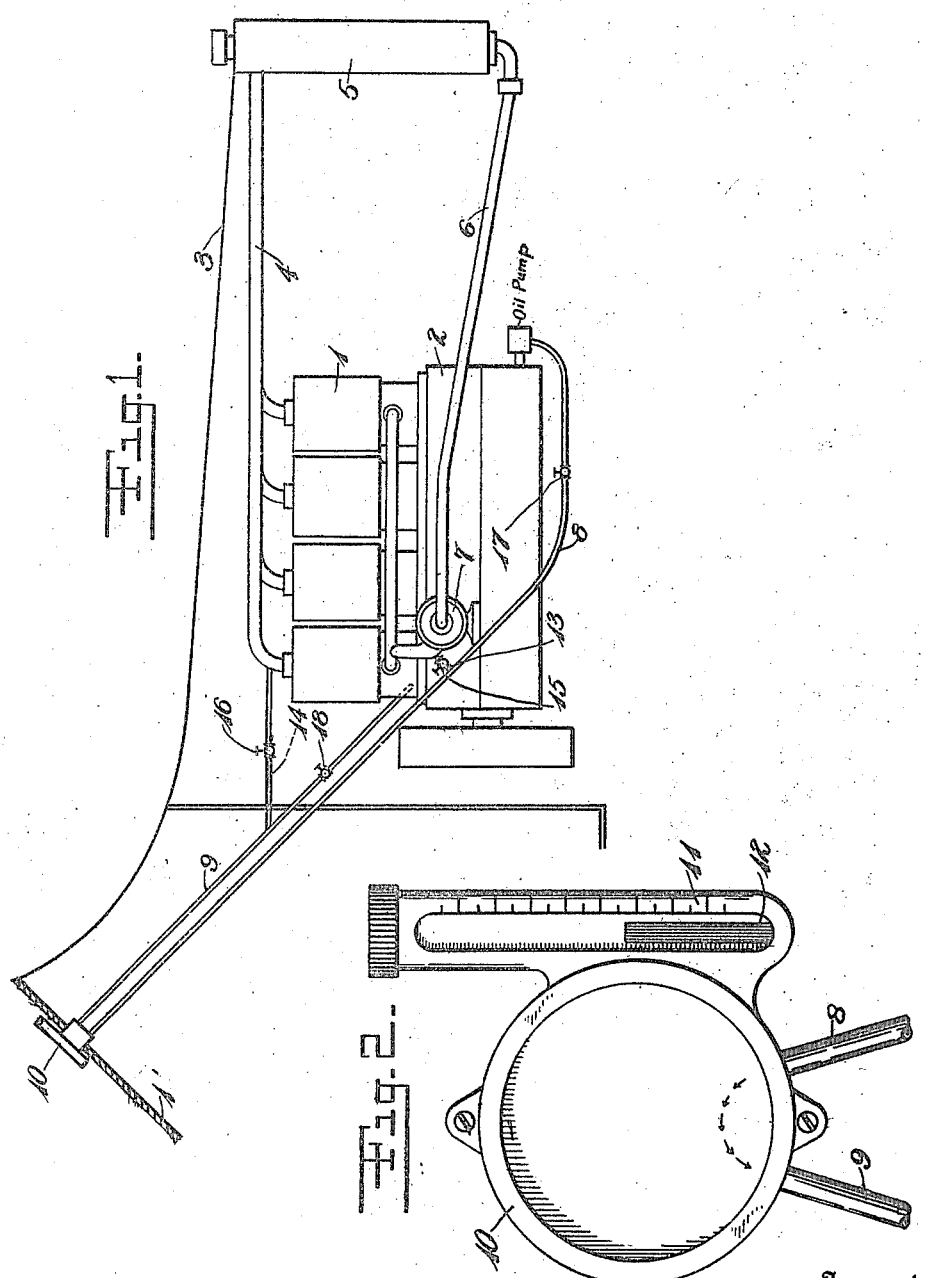

GEORGE S. WITHAM, JR., OF AU SABLE FORKS, NEW YORK.

SAFETY-INDICATOR FOR SELF-PROPELLED VEHICLES.

1,296,148.  Specification of Letters Patent.  Patented Mar. 4, 1919.

Application filed October 1, 1915. Serial No. 53,500.

*To all whom it may concern:*

Be it known that I, GEORGE S. WITHAM, Jr., a citizen of the United States, residing at Au Sable Forks, Essex county, State of New York, have invented certain new and useful Improvements in Safety-Indicators for Self-Propelled Vehicles; and I do hereby declare the following to be a full, clear, and exact description of the invention, such as will enable others skilled in the art to which it appertains to make and use the same.

My invention relates to a safety indicating device for self-propelled vehicles, such as automobiles, aeroplanes, motor boats, etc., and it comprises such an indicating device constructed and arranged to indicate, in a continuous and automatic manner, the thermal and other conditions of the internal combustion engine of such vehicles, and of the circulatory systems thereof.

The internal combustion engines of self-propelled vehicles are commonly provided with cooling systems, and with lubricating systems for the purpose of keeping the engine in proper working order. Devices have heretofore been proposed for indicating the temperature and flow of the liquids in said systems. The novel safety indicating device of the present invention comprises an improved construction for indicating, in an automatic and continuous manner, and at a point distant from the engine, both to flow and thermal conditions of the circulatory liquid therein.

The invention will be described more particularly in connection with the embodiment thereof illustrated in the accompanying drawings, but it will be understood that the invention is illustrated by, but is not limited to, the specific embodiment thus illustrated and described.

In the accompanying drawings,—

Figure 1 shows, in elevation, and partly in diagram, an automobile engine with the invention embodied therein; and Fig. 2 is an enlarged view of the flow and thermal indicating device itself, separate from the engine.

The automobile and engine illustrated in diagram in Fig. 1, may be of any suitable or preferred construction. It is shown as made up of the cylinders 1 and crank case 2, suitably inclosed within the hood 3. The radiator for the cooling liquid is indicated at 5 and communicates with the cylinder jackets through the pipes 4 and 6, circulation being effected or promoted by means of the pump 7.

The crank case 2 is provided with any suitable lubricating system. From this system the oil is drawn off through the pipe 8 to the sight feed device 10, the oil returning through the return pipe 9, and the circulation being effected by a suitable oil pump, as shown. The oil sight feed 10 is suitably arranged upon the dash-board or instrument board 11, at a distant point from the engine. It will of course be understood that this device can be variously arranged wherever it may be convenient for observation, and that the arrangement will also depend upon the nature of the vehicle, whether an automobile, air-ship or motor boat.

In the operation of the sight feed device, the oil is circulated from the lubricating system in a continuous manner, so that any interruption in the flow of the oil gives a warning of abnormal conditions in the lubricating system. If the oil is being continuously pumped through the indicating device, or gravitates through the sight feed glass, the operator knows that the engine contains a sufficient amount of oil and that it is being circulated properly.

There are, however, many abnormal conditions within the lubricating system, or sufficiently related thereto as to be indicated thereby, which are not indicated by the sight feed device. These conditions are particularly the thermal conditions due to abnormal increase in temperature. A low grade of oil, an insufficient amount of oil, low water in the radiator with resulting overheating thereof, hot bearings, dirty spark plugs, and over-working of the engine, are some of the abnormal conditions which result in overheating of the oil and thereby give indication of their existence.

According to the present invention, means is provided for indicating in an automatic and continuous manner the thermal condition of the oil, and this means is associated with the oil sight feed device so that the observer is able to determine by a mere glance at the instrument whether the oil is being properly circulated, and whether its temperature is within the normal range. This thermal in dicating device is shown in Fig. 2 as a thermometer 12 having a suitable indicating scale 11. Since sight feed devices sometimes have moving parts, provision is made in the construction of the device of Fig. 2 for the operation of the thermal indicating device without interference with such moving parts. To this end, the sight feed casing is provided with an extension, communicating therewith, and the thermometer is placed in this extension so that the oil continuously circulates in contact therewith, as well as through the sight feed device.

It will be noted that branch pipes connect the sight feed supply and return pipes 8 and 9 with the cooling system at its upper and lower portions. These branch pipes 13 and 14 are provided with cut-off valves 15 and 16 respectively, and the pipes 8 and 9 are also provided with cut-off valves 17 and 18 at a point between the branch pipes and their connection with the lubricating system. With this arrangement, either the lubricating system or the cooling system can be connected with the indicating device, and either the oil or the cooling liquid circulated therethrough. By a proper connection between the various valves (not shown), the disconnection of one system, and the connection to the other, can be simultaneously effected.

With the indicating device of the present invention applied to an automobile, or to other self-propelled vehicle, the operator will be able to tell at a glance whether the oil is properly circulating through the lubricating system, or whether the cooling liquid is being properly circulated. He will also be able to tell at a glance, and from the same instrument, when abnormal conditions, such as those indicated above, have caused an abnormal rise in temperature.

There is thus provided, according to the present invention, a single indicating instrument which will indicate, in a continuous and automatic manner, both the thermal and the flow conditions of the circulatory system. The engine is thus protected against accidental injury due to the various causes enumerated which will be immediately apparent in the form of a rise in temperature. Such a rise in temperature serves as a warning of the abnormal conditions which require attention.

While I have illustrated and described a preferred embodiment of the invention, and one having many practical advantages, nevertheless I do not limit myself to the exact details of the construction shown, but intend and understand that the invention is illustrated by, but is not limited to, this specific embodiment illustrated and described.

What I claim is:

1. A safety indicating system for circulatory systems of internal combustion engines, comprising means for simultaneously indicating the temperature of a liquid and the existence of pressure of a liquid, and means for conveying liquid from any one of the circulatory systems to said indicating means.

2. A safety indicating device for the cooling and lubricating systems of an internal combustion engine, comprising in combination, means for indicating the existence of pressure, valve controlled means for connecting said indicating means with either the cooling or the lubricating systems whereby the existence of pressure in either one of said systems may be indicated, and means associated with said indicating means for simultaneously indicating the thermal condition of the liquid in the system to which said indicating means is connected.

3. A safety indicating system for circulatory systems of internal combustion engines, comprising a unitary casing having a circular sight-feed chamber therein, and a lateral extension forming a tubular chamber, the front faces of said chambers being provided with apertures, transparent closures for said apertures, a thermometer mounted in said tubular chamber, pipes connected to said casing by means of which liquid may be supplied to and conducted from said casing, and means for placing said pipes in communication with any one of the circulatory systems.

4. A safety indicating device for the cooling and lubricating systems of an internal combustion engine, comprising, in combination, a flow indicating device arranged at a distant point from said cooling and lubricating systems, valve-controlled means connecting said indicating device with the cooling and the lubricating systems whereby either the cooling or lubricating liquids can be circulated therethrough, and means associated with said indicating device for indicating in a continuous and automatic manner the thermal condition of said liquid; substantially as described.

5. A safety indicating device for the circulatory systems of internal combustion engines, comprising, in combination, a casing having a plurality of communicating chambers therein, means for conveying fluid from any one of the circulatory systems to said casing, and a thermometer in one of said chambers for indicating in a continuous and automatic manner the thermal condition of said liquid.

6. A safety indicating device for the circulatory systems of internal combustion engines, comprising, in combination, a flow-indicating device arranged at a distant point from said circulatory systems, means connecting said indicating device with said systems, means associated with said connecting means for controlling the flow of fluid from any one of said circulatory systems to said indicating device, and means associated with said indicating device for indicating in a continuous and automatic manner the thermal condition of said liquid; substantially as described.

7. A safety indicating device for the cooling and lubricating systems of an internal combustion engine, comprising, in combination, a receptacle arranged at a distant point from said cooling and lubricating systems, valve controlled means connecting said receptacle with the cooling and the lubricating systems whereby either the cooling or the lubricating liquids can be circulated therethrough, and means within said receptacle for indicating in a continuous and automatic manner the thermal condition of said liquid.

8. A combined flow and thermal indicating device for the circulatory systems of an internal combustion engine, comprising a casing having a sight-feed chamber therein, means for circulating liquid from any one of said systems into said casing and through said chamber, said casing being provided with a lateral extension through which liquid may flow from the chamber, and a thermometer arranged in said extension in heat interchanging relation to the liquid flowing therethrough and arranged to be observed simultaneously with the flow of liquid in the sight-feed chamber.

9. A safety indicating system for the cooling and lubricating systems of internal combustion engines, comprising, in combination, a flow indicating device arranged at a distant point from said cooling and lubricating systems, a valve-controlled means for connecting said indicating device with either one of said systems and disconnecting it from the other whereby either the cooling or the lubricating fluid may be circulated through the device, and means associated with said device for indicating in a continuous and automatic manner the thermal condition of said fluid; substantially as described.

10. A safety indicating system for the circulatory systems of internal combustion engines, comprising a casing having a plurality of communicating chambers therein, one of said chambers being constructed to produce a visible indication of the flow of liquid therein, a thermometer in another of said chambers for simultaneously giving an indication of the temperature of the liquid, and means for conveying liquid from any one of the circulatory systems to said casing.

In testimony whereof I affix my signature.

GEORGE S. WITHAM, Jr.